United States Patent
Moran (10) Patent No.: US 8,737,977 B2
(45) Date of Patent: May 27, 2014

(54) SYSTEMS AND METHODS FOR INTERGRATING TELEPHONE COMMUNICATION WITH COMPUTING DEVICES

(75) Inventor: Dov Moran, Kfar Saba (IL)

(73) Assignee: Comigo Ltd., Hod-HaSharon (IL)

( * ) Notice: Subject to any disclaimer, the term of this patent is extended or adjusted under 35 U.S.C. 154(b) by 0 days.

(21) Appl. No.: 13/330,730

(22) Filed: Dec. 20, 2011

(65) Prior Publication Data

US 2013/0157632 A1 Jun. 20, 2013

(51) Int. Cl.
*H04M 3/42* (2006.01)
(52) U.S. Cl.
USPC .......................... 455/415; 455/420; 455/557
(58) Field of Classification Search
USPC ........ 455/414.1, 415, 418–420, 556.1, 556.2, 455/557, 575.2; 379/142.06, 142.17
See application file for complete search history.

(56) References Cited

U.S. PATENT DOCUMENTS

| | | | |
|---|---|---|---|
| 2004/0171372 A1* | 9/2004 | Tokudome | 455/415 |
| 2005/0233735 A1* | 10/2005 | Karaoguz et al. | 455/415 |
| 2007/0036313 A1* | 2/2007 | White et al. | 379/142.17 |
| 2007/0243907 A1* | 10/2007 | Jin et al. | 455/566 |
| 2008/0052400 A1* | 2/2008 | Ekberg | 709/227 |
| 2009/0136019 A1* | 5/2009 | Lund | 379/355.02 |
| 2009/0251526 A1* | 10/2009 | Book | 348/14.01 |
| 2010/0330970 A1* | 12/2010 | Skog et al. | 455/415 |
| 2011/0098086 A1* | 4/2011 | Nagata | 455/557 |
| 2011/0222549 A1* | 9/2011 | Connelly et al. | 370/401 |
| 2012/0115449 A1* | 5/2012 | Bruchelt | 455/415 |

* cited by examiner

*Primary Examiner* — Magdi Elhag (57) ABSTRACT

An integrated communication system and method includes a primary unit and a secondary unit comprising transceivers for communicating therebetween and a communication management unit operable to manage communication with a telephone network. The system and method may be used to provide detachable headset units for a user to communicate via a communication management unit of the primary unit or for presenting useful second party related information to a user when communicating with the second party over a telephonic network connection. The system and method may provide a convenient system whereby a user may select between various communication devices to manage telephonic communication with a common client account.

16 Claims, 7 Drawing Sheets

SYSTEMS AND METHODS FOR INTERGRATING TELEPHONE COMMUNICATION WITH COMPUTING DEVICES

FIELD AND BACKGROUND OF THE INVENTION

The disclosure herein relates to telephonic communication devices. In particular the disclosure relates to systems for integrating telephone communication into computing systems.

Tablet computers, or tablets, are computing devices typically larger than handheld computing devices such as mobile telephones and personal digital assistants (PDAs) and more convenient than laptop computers. Tablets typically have a touch screen user interface rather than or in addition to mouse pointing devices and physical keyboard interfaces commonly associated with personal computers. Consequently, tablets may be particularly useful in environments where a keyboard and mouse are not practical, such as when no horizontal surface is available or when one hand is needed support the device for example.

As a result, tablet computers have become a tool of choice for many users who need computing power when they are out-and-about, standing up, leaning back or otherwise away from a desk. Although some communication devices such as PDAs and mobile telephones, particularly so called smart phones and the like, may offer mobile computing power, they tend to have much smaller screen sizes limiting the amount of information that they may be able to display. Moreover, during a call a mobile telephone is typically held to the user's ear resulting in the screen of the device not being accessible to the user.

Although some tablets are connected to a telephone network, they are not practical for use as telephones due to their large size. Many users therefore carry around multiple computing devices and communication devices such as both a mobile telephone and a tablet computer.

SUMMARY OF THE INVENTION

Aspects of the disclosure are directed towards presenting an integrated communication system comprising a primary unit and a secondary unit. The primary unit may comprise a primary transceiver for communicating with the secondary unit and the secondary unit may comprise a secondary transceiver for communicating with the primary unit. At least one of the primary unit and the secondary unit may comprise a communication management unit operable to manage communication with a telephone network. Additionally, at least one of the primary unit and the secondary unit may comprise an audio input device and an audio output device.

Optionally, at least one of the primary unit and the secondary unit may comprise a visual display unit. Accordingly, the communication with a telephone network may connect the communication system to a second party and the visual display unit may be operable to display information pertaining to the second party. Such information may be variously selected from a group consisting of inter alia: contact details, avatars, images, social networking sites, email communications, calendar entries and the like. Additionally or alternatively, the information may comprise reminders related to the second party. In some systems the information is presented upon a user configurable graphical user interface.

Variously, at least one of the primary unit and the secondary unit may comprise a computing device. Optionally, at least one of the primary unit and the secondary unit comprises a tablet computer. Optionally again, the secondary unit may comprise a headset unit. Accordingly, the system may further comprise a mechanical coupling mechanism for attaching the headset unit to the primary unit.

Additionally or alternatively, the system may further comprise a charging mechanism configured to transfer power to the headset when the headset unit is coupled to the primary unit. Optionlly, the charging mechanism may comprise conductive contacts between the headset unit and the primary unit. Alternatively, or additionally, the charging mechanisms may comprise a primary induction coil associated with the primary unit and configured to couple with a secondary induction coil associated with the headset unit.

Where appropriate, the communication management unit may be configured to disconnect a telephonic communication channel when the headset unit is coupled to the primary unit. Furthermore, the communication management unit may be configured to connect a telephonic communication channel when the headset unit is decoupled from the primary unit.

According to certain embodiments, the primary unit is configured to present a graphical user interface upon a visual display unit when the headset is decoupled from the computing device.

Optionally, the primary unit comprises a first communication management unit and the secondary unit comprises a second communication management unit the first communication management unit and the second communication management unit for managing communication between the telephone network and a common client account. Accordingly, at least one of the primary unit and the secondary unit may be operable to execute a software application for selecting one of the first communication management unit and the second communication management unit to manage the communication with the telephone network.

Another aspect of the disclosure is to teach a method for presenting second party related information upon a visual display unit when a telephone communication channel is established between a communication system and the second party. The method may comprise: establishing a telephonic connection between the communication system and the second party; identifying the second party; obtaining information pertaining to the second party; and displaying the information in a graphical user interface.

Optionally, obtaining information pertaining to the second party may comprise accessing data stored in a local memory. Optionally, again, obtaining information pertaining to the second party may comprise: establishing a network connection between the communication system and a remote computer network; and retrieving data pertaining to the second party stored in the computer network.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DESCRIPTION OF SPECIFIC EMBODIMENTS OF THE INVENTION

Aspects of the present disclosure relate to integrated communication systems for example integrated into computing systems. Optionally, an integrated communication system may include a primary unit and a secondary unit. The primary units may be variously communication devices or computing devices such as tablet computers, laptop computers, media receivers, telephone terminals or such like.

The primary unit and the secondary unit are operable to establish a communication channel therebetween. Accordingly, the primary unit has a primary transceiver for communicating with the secondary unit and the secondary unit has a secondary transceiver for communicating with the primary unit. At least one of the primary unit and the secondary unit generally includes a communication management unit operable to manage communication with a telephone network. Furthermore, at least one of the primary unit and the secondary unit comprises an audio input device such as a microphone and an audio output device such as a speaker.

In various aspects of the disclosure the integrated system may be used to provide secondary units comprising detachable headsets for a user to communicate via a communication management unit of the primary unit.

Other aspects of the disclosure relate to systems and methods for displaying useful second party related information to a user when communicating with the second party over a telephonic network connection.

In still other aspects the disclosure may provide a convenient system whereby a user may select between various communication devices to manage telephonic communication with a common client account.

It is noted that the systems and methods of the disclosure herein may not be limited in its application to the details of construction and the arrangement of the components or methods set forth in the description or illustrated in the drawings and examples. The systems and methods of the disclosure may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Figure 1:
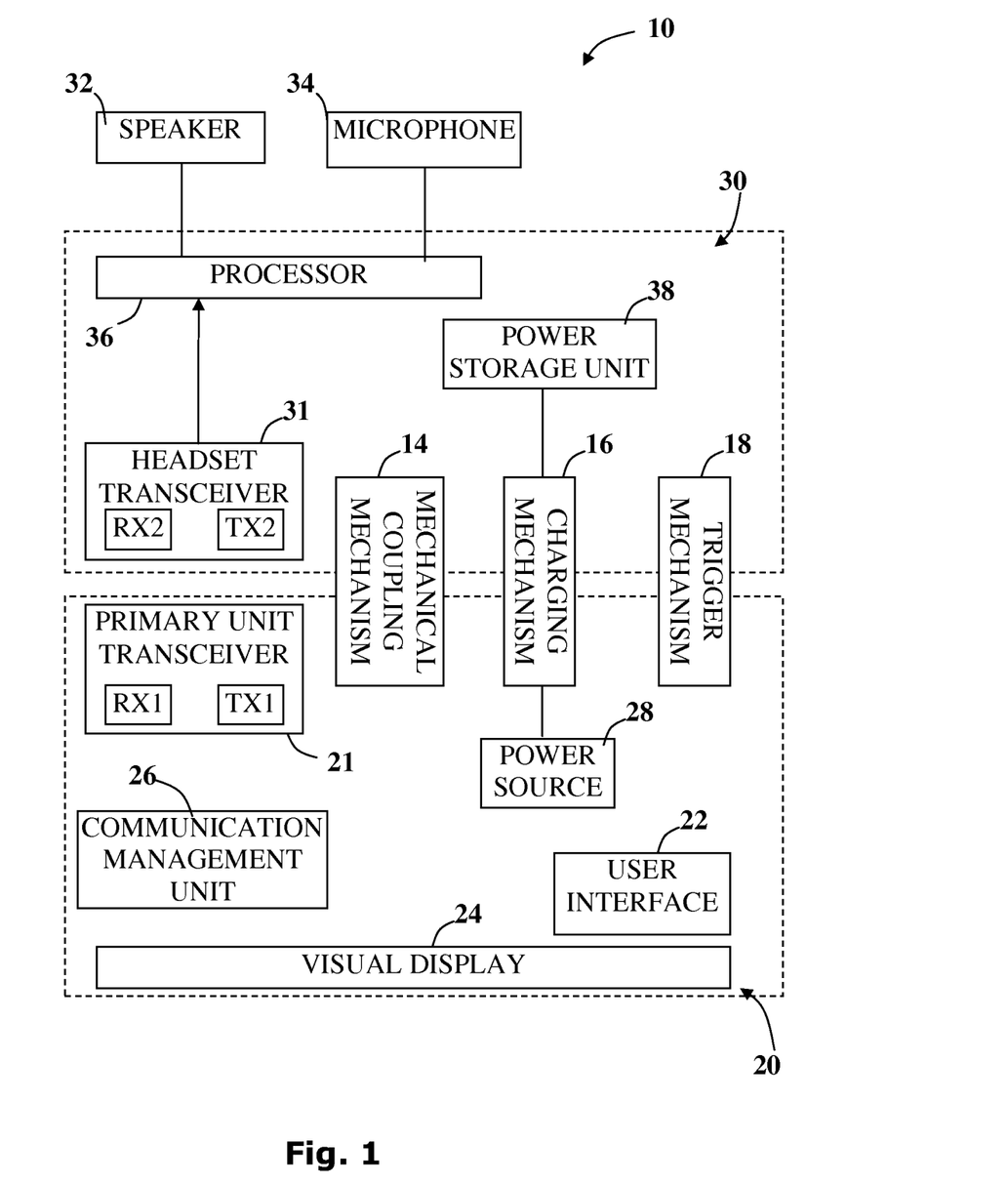
FIG. 1 is a block diagram showing selected elements of an integrated communication system including a primary unit and a secondary unit.

Reference is now made to the block diagram of FIG. 1 representing selected elements of an integrated communication system 10 including a primary unit 20 and a secondary headset unit 30. The integrated communication system 10 may allow a user to communicate via the telephone network using a remote headset unit 30.

The primary unit 20 includes a communication management system 26 operable to manage telephonic communications for example via a telephone network such as a fixed line network, public switched network, wireless network, private network, cellular network, voice over internet protocol (VOIP) network or the like.

The primary unit 20 may be integrated into a computing device such as a tablet computer, laptop computer or the like. Accordingly, a user may interact with the communication management system 36 to the primary unit 20 using an input interface 22 such as a touch sensitive screen, a physical or virtual keyboard or pointing device such as a mouse or the like. Other embodiments of the primary unit 20 may be integrated into television sets, set-top-boxes, display units and the like. Optionally the primary unit 20 provides output to the user via a visual display 34. As noted hereinbelow, the visual display 34 may provide a platform for presenting useful information to a user.

Typically the headset includes at least one speaker 32, at least one microphone 34, a processor 36 and a power storage unit 38. The speaker 32 is provided to convert electrical signals to audible signals for transmitting to the user. The microphone 34 is provided to convert audio signals to electrical signals for communicating to the primary unit 20. The processor 36 is provided to manage communication between the speaker 32, the microphone 34 and the headset transceiver 31.

Communication between the primary unit 20 and the headset unit 30 may be provided by a primary unit transceiver 21 and a headset transceiver 31. The primary unit transceiver 21 may include a primary receiver RX1 and primary transmitter TX1, operable to exchange signals with a secondary receiver RX2 and a secondary transmitter TX2 of the headset transceiver 21. Accordingly a two way communication channel may be available between the primary unit 20 and the headset unit 30. Various communication protocols for use between the headset 30 and primary unit 20 are known in the art, in particular a wireless protocol may be used such as Bluetooth, WiFi, ZigBee, RuBee or the like. Other communication protocols will occur to those skilled in the art.

It is a particular feature of certain embodiments of the integrated communication system 10 that a mechanical coupling mechanism 14 may be provided to attach the headset 30 to the primary unit 20. The mechanical coupling mechanism 14 such as a hook and eye connector, catch lock, bolt, screw connector, magnetic connector or such like, may allow the headset 20 to be conveniently stowed when not in use thereby protecting the headset 30 from damage or loss.

A further feature of embodiments of the integrated communication systems 10 is that a charging mechanism 16 may be provided allowing the power storage unit 38 of the headset 30 to be charged up by receiving power from the power source 28 of the primary unit 20. Various charging mechanisms may be used for example conductive contacts on the headset 30 provided to conductively connect with conductive contacts in the primary unit 20. Alternatively or additionally, an inductive power transfer system may be provided allowing power to be transferred from a primary coil associated with the primary unit to a secondary coil associated with the headset. Still further charging mechanisms will occur to those in the art.

It is particularly noted that providing a charging mechanism may indeed motivate the user to return the headset 30 to the primary unit 20 after use. Still further motivation may be provided by a trigger mechanism 18 for disconnecting a telephonic communication when the primary unit 20 detects that the headset 30 has been coupled thereto and for initiating a telephonic communication when the primary unit 20 detects that the headset 30 is decoupled therefrom.

Figures 2A, 2B, 2C:
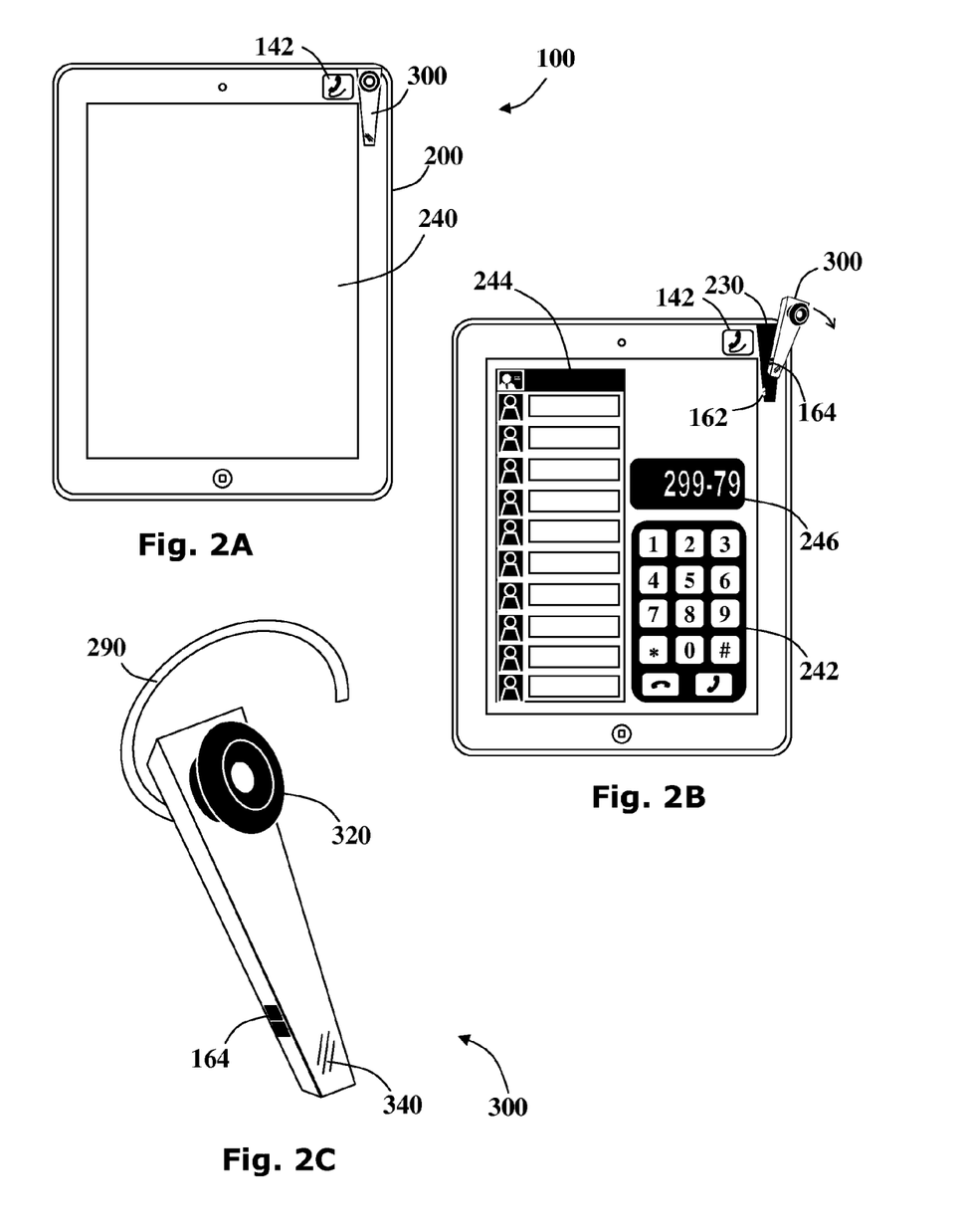
FIG. 2A schematically represents a front view of one embodiment of a communication system including a secondary headset unit integrated into a tablet computer.
FIG. 2B schematically represents a front view of the integrated communication system of FIG. 2A in telephonic mode.
FIG. 2C schematically represents on possible embodiment of a secondary headset unit for use in an integrated communication system.

For illustrative purposes only and so as to be better clarify the disclosure, reference is now made to FIGS. 2A-C in which a particular example of the integrated communication system 100 is schematically represented integrated into a tablet computer 200. FIG. 2A schematically represents a front view of the integrated communication system 100 in standby mode, FIG. 2B schematically represents a front view of the integrated communication system 100 in telephonic mode, and FIG. 2C schematically represents a close up view of a possible headset 30 unit which may be used in the integrated communication system 100 of FIGS. 2A and 2B.

The primary unit 200 of the integrated communication system 100 of the example is a tablet computer having a touch screen 240 user interface, a detachable headset 300 and a release button 142. As illustrated in FIG. 2A, in standby mode, the headset 300 may be stowed within a dock 230 in the primary unit 200. It will be appreciated that, as noted above, when stowed within its dock, the headset 200 may be protected against damage or loss.

Figure 5A:
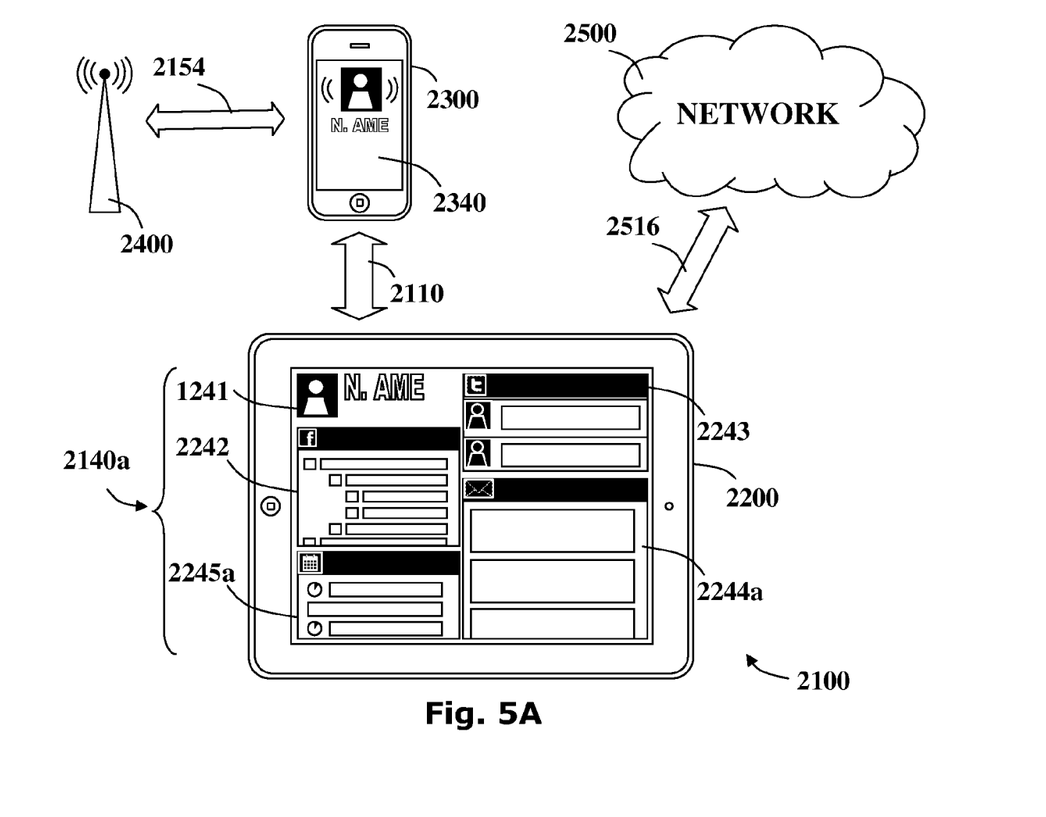
FIGS. 5A and 5B schematically represent an integrated communication system in which a visual display of a tablet computer presents caller related information to a user.
Figure 5B:
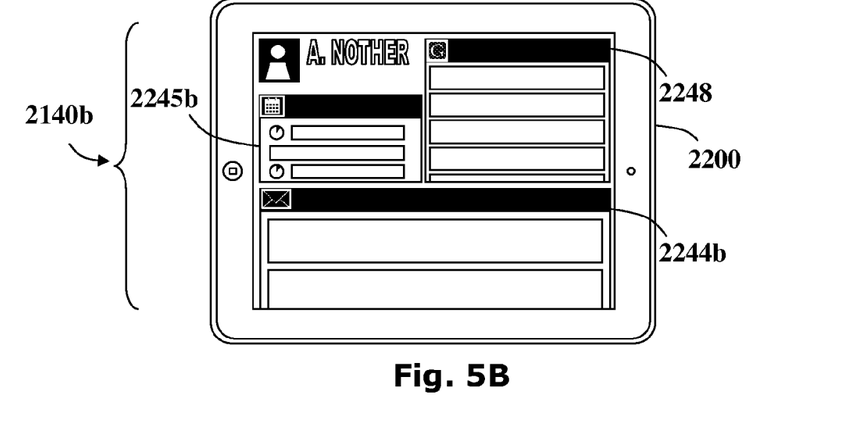

Referring now to FIG. 2B, the integrated communication system 100 is represented in telephonic mode. By pressing upon the release button 142, the headset is detached from the dock 230 and telephonic mode is initiated. Optionally, in telephonic mode, the touch screen 240 of the tablet may display a telephonic interface. In one example, particularly where the user initiates a new telephone call, the telephonic interface may include a keypad 242, a number display 246 and a contact list 244. Where a caller receives a telephone call from a second party or once a telephone connection has been established the telephonic interface display may present other useful information such as represented in FIGS. 5A and 5B and described hereinbelow. Still other telephonic interface displays will occur to those in the art.

With reference to FIG. 2C, the headset 300 of the example may include a microphone 340, a speaker 320 and an ear-grip 390. Accordingly, the headset 300 may be secured hands-free to the ear of the user leaving the user two hands free to support and interface with the tablet device. It is further noted that the headset 300 may have conductive contacts 164 configured to conductively couple with corresponding conductive contacts of the tablet 162 to form a conductive path therebetween for charging an internal power store 38 (FIG. 1) of the headset 300.

Figure 3A:
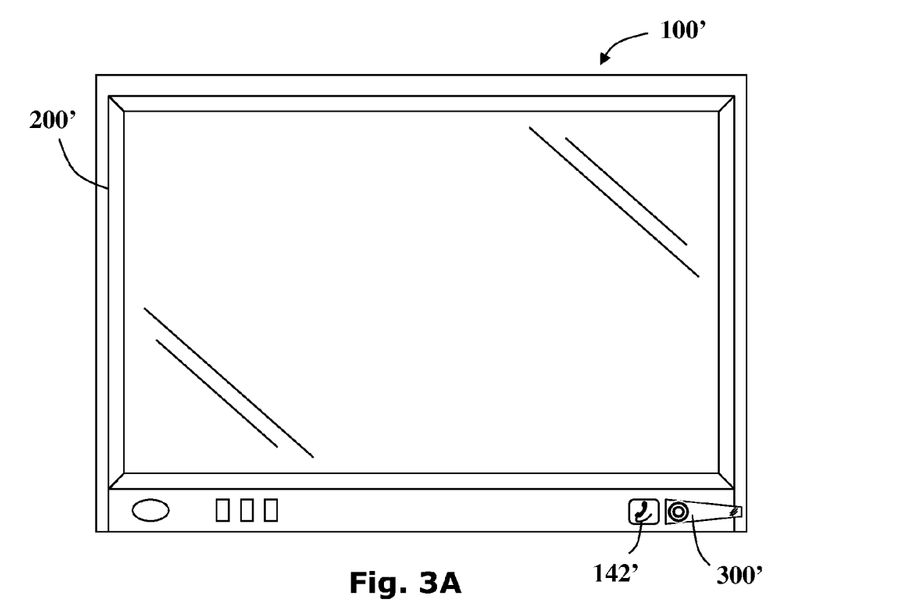
FIG. 3A schematically represents an alternative embodiment of a communication system including a secondary headset unit integrated into a television.
Figure 3B:
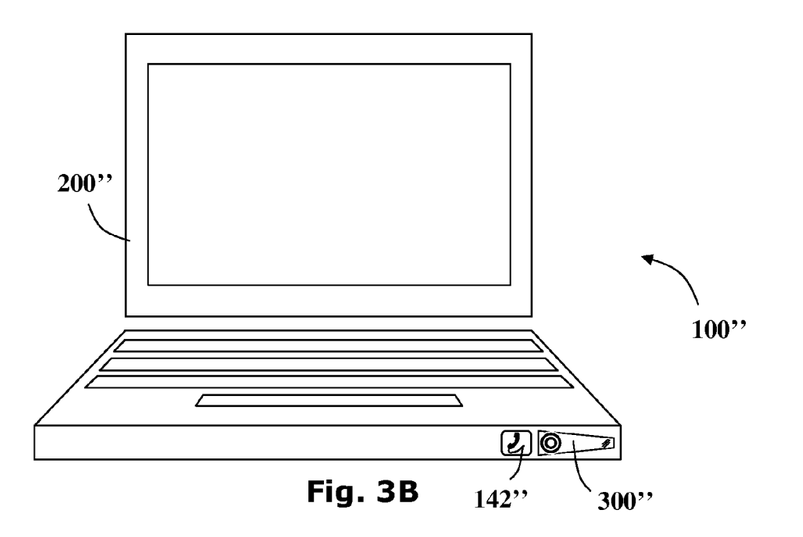
FIG. 3B schematically represents an alternative embodiment of a communication system including a secondary headset unit integrated into a laptop computer.

Alternative embodiments of the integrated communication system 100', 100" are represented in FIGS. 3A and 3B. FIG. 3A represents how a headpiece 300' may be integrated into a dock in a television set 200' primary unit along with a release button 142'. It is noted that where appropriate, a remote control unit (not shown) may be used to provide user input in telephonic mode. FIG. 3B represents how a headpiece may be integrated into a dock in a laptop computer 200" primary unit along with a release button 142".

Figure 4A:
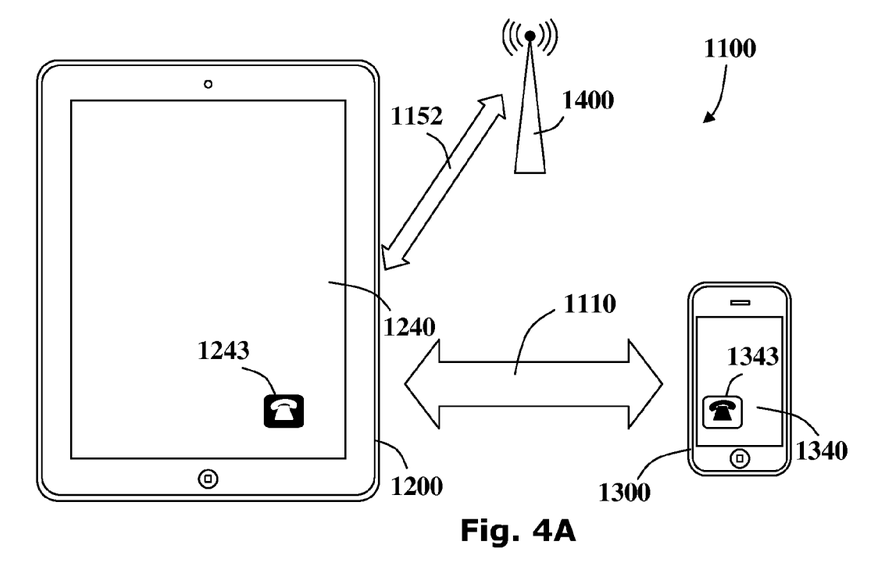
FIGS. 4A and 4B schematically represent an integrated communication system in which a tablet computer is matched to a mobile telephone.
Figure 4B:
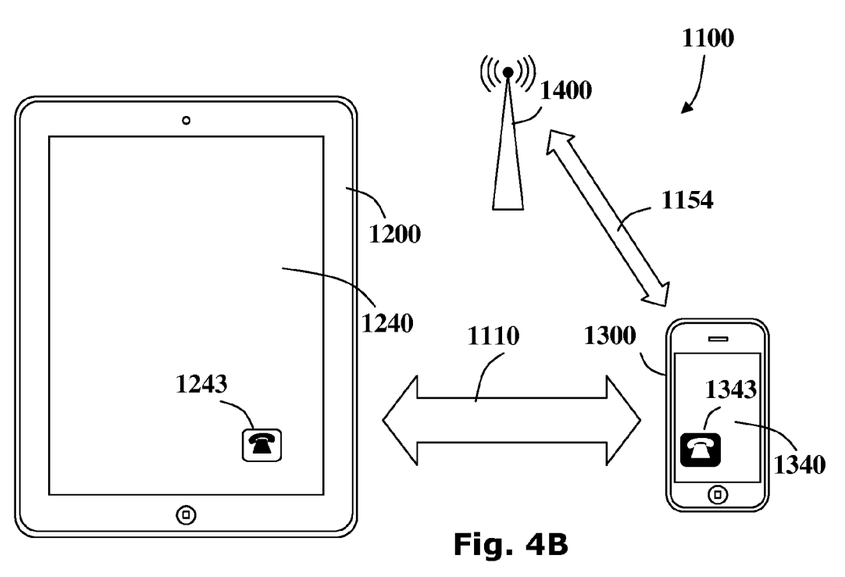

Reference is now made to FIGS. 4A and 4B showing another embodiment of the integrated communication system 1100. A matched integrated communication system 1100 includes a primary unit 1200 and a secondary unit 1300 having a communication channel 1110 therebetween. It is noted that both the primary unit 1200 and the secondary unit 1300 of the embodiment include communication management units enabling them to establish a connection 1152, 1154, directly or indirectly, with a telephone network 1400, such as fixed line network, public switched network, wireless network, private network, cellular network, voice over internet protocol (VOIP) network or the like.

It is a particular feature of the embodiment that the primary unit 200 and secondary unit 300 may be paired such that both the network connections 1152, 1154 established by the units correspond to a common client account. A user may thus select which unit 1200, 1300 to use as a telephonic terminal as suits requirements.

By way of example only, a primary unit 1200 may be, for example a tablet computer and a secondary unit 1300 may be a mobile telephone. It will be appreciated that a user may not wish to carry both these devices simultaneously. A user may, for example, generally carry the tablet computer for most purposes but may prefer to carry a smaller device, such as the mobile telephone so as to be less encumbered, say, when visiting the gym or the like. This situation may be particularly pertinent where the tablet includes an integrated headset such as described hereinabove in relation to FIG. 2A, such that the tablet is easy to use as a communication device.

In order to select whichever unit is more convenient, the user may pair the tablet computer to the mobile telephone, say by installing a software application establishing a communication channel 1110 therebetween. Optionally, icons, 1243, 1343 may be displayed upon the screens 1240, 1340 indicating which unit is active as a telephonic terminal.

With particular reference to FIG. 4A, the primary unit 1200 has an active network connection 1152 as indicated by the black background of the indicator icon 1243, whereas the secondary unit 1300 is disconnected from the network 1400 as indicated by the white background of the indicator icon 1343 displayed thereupon. The user may be able to switch the active unit, for example, by pressing upon the icon of the inactive device. FIG. 4b shows the switched system wherein the secondary unit 1300 has an active network connection 1154 as indicated by the black background of the indicator icon 1343, whereas the primary unit 1200 is now disconnected from the network 1400 as indicated by the white background of the indicator icon 1243 displayed thereupon.

It is noted that other methods of switching the active network connection may alternatively be used, such as physical buttons, perhaps on a keypad. Furthermore, in certain embodiments, the active network may be switched remotely, for example from the currently active unit, via a website or the like.

Although only two paired devices are described herein, it is further noted that the matched integrated communication system 1100 may optionally include more than two devices, for example, allowing a user to switch between a tablet computer, a mobile telephone, a laptop computer and a landline telephone terminal, say, as required.

Reference is now made to FIGS. 5A and 5B schematically representing how an integrated communication system 2100 may be used to present caller related information to a user during a telephone communication. The integrated communication system 2100 includes a primary unit 2200 and a secondary unit 2300 having a communication channel 2110 therebetween. The primary unit 2200, for example a tablet computer or the like, may be operable to manage the presentation of useful information to the user. The secondary unit 3200, a mobile telephone for example, manages the telephonic communication by establishing a network connection 2154 with a telephone network 2400, such that the user may communicate with a second party. It will be appreciated that in various embodiments, the primary unit 2200 may be further operable to manage the telephonic communication itself with the secondary unit serving to relay the signals to a user.

Variously, the telephonic communication may be initiated by the user, for example by making a telephone call to the second party. Alternatively, the telephonic communication may be intiated by the second party, for example when the user receives and accepts a telephone call. Optionally some caller information, for example the identity of the second party or number of the caller may be presented on a visual display 2340 of the secondary unit 2300. It is a feature of the embodiment of the integrated communication system that the primary unit 2200 is configured to present additional information pertaining to the second party and which may be of use to the user during the telephone communication.

By way of example only, a possible information display 2240a is shown on the screen of the secondary unit 2200 in FIG. 5A. The information may include contact details of the second party 2241, such as a name, number, image, avatar or the like. Additional information may be displayed such as details of the second party's social networking sites such as a facebook page 2242, twitter account 2243, Google plus account (not shown) or the like. Furthermore, information may be presented pertaining to the user's interaction with the second party such as a selection of email communications 2244a or a list of meetings 2245a involving the second party or the like.

It is noted that optionally the primary unit 2200 may obtain data for displaying locally, for example by accessing a local memory of the primary unit 2200 perhaps using email management applications, calendar applications or the like. Alternatively or additionally the primary unit 2200 may be connected to a computer network 2500 such as the world wide web, a local area network or the like, and may obtain second party information therefrom via a network connection 2156.

It is noted that the graphical interface 2240a of the contact information display may have a standard configuration for all contacts or may be adjustable such that the user may customize the display to suit each second party. In some embodiments, the primary unit may be operable to store user preferences for each contact such that the information is presented appropriately according to the caller.

By way of illustration, FIG. 5B shows an alternative information display 2240b for another contact. It is noted that the email communication list 2244b and meeting list 2245b have been resized and moved. Furthermore, internet search results 2248 are presented providing further information that may be relevant as required by the user.

It is a particular feature that the user may be able to set reminders or alarms to be displayed when certain contacts call. For example a user may set a reminder such as "tell him to pick up the kids", or "tell her that Jon called" to be displayed when particular contacts call. Alternatively or additionally, the system may set automatic notifications, for example, if a telephone connection is established with a second party on an anniversary such a birthday, child's birthday or the like, the system may prompt the user automatically to relate to the anniversary during the conversation, if appropriate. Other uses and applications for such a reminder system will readily occur to a user.

Figure 6A:
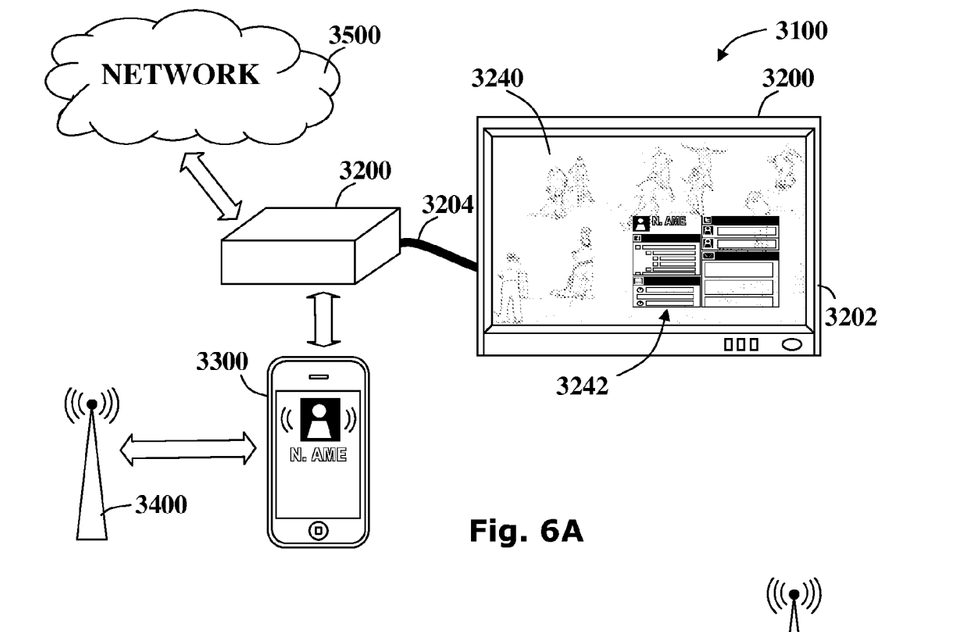
FIGS. 6A and 6B schematically represent how a visual display of a television screen or a computer may be used to present caller related information to a user.
Figure 6B:
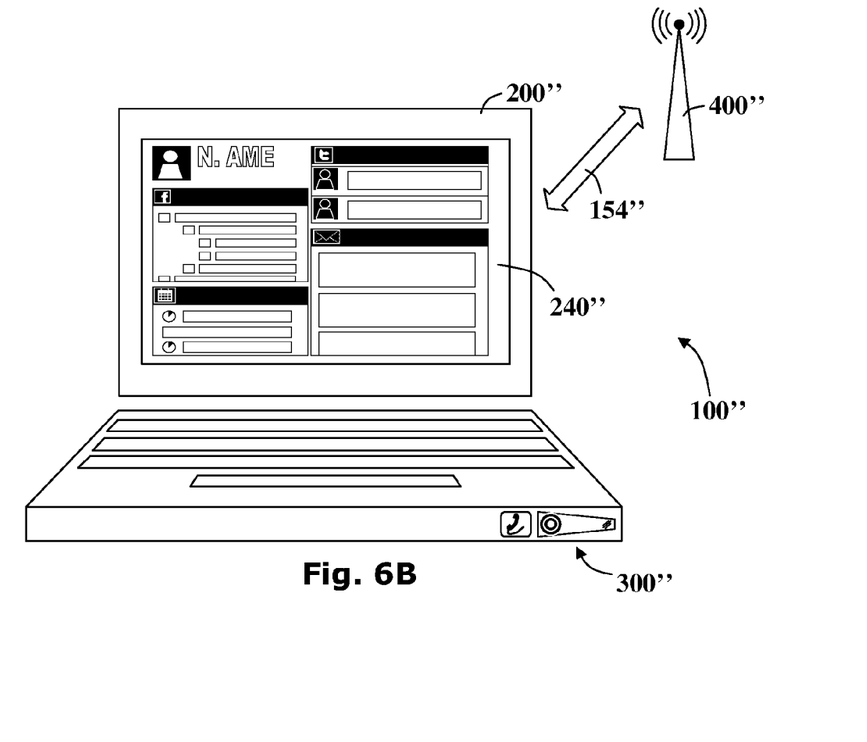

Referring now to FIGS. 6A and 6B, schematic representations are presented of other embodiments in which a television screen 3240 or a computer display 240" may be used to present caller related information to a user.

With particular reference to FIG. 6A, the primary unit 3200 may comprise a set-top-box connected to a television set 3202 via a cable, such as an HDMI cable or the like and operable to control the television display 3240. The set-top-box (STB) 3200 may be further connected to a computer network 3500. The secondary unit 3300, a mobile phone say, may be operable to manage the network communication with a telephone network 3400 and to communicate with the STB 3200. Optionally, the STB 3200 may present the contact information for example in an overlay section 3242 upon the television screen 3240.

Referring now to FIG. 6B, the integrated communication system 100" of FIG. 3B is shown displaying caller related information on its visual display 240". It is particularly noted that in this embodiment, the primary unit 200" controls both the information display as well as the network communication 154" with the telephone network 400". The secondary unit 300" of the embodiment comprising the headset as described hereinabove.

Figure 7:
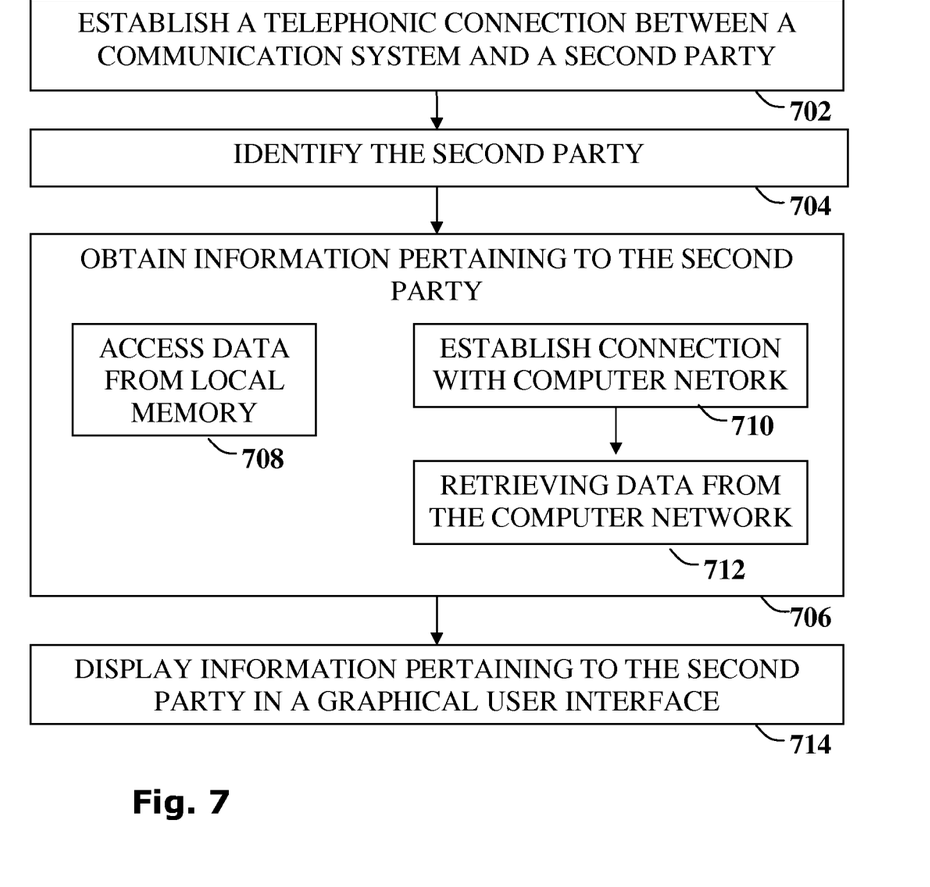
FIG. 7 is a method for displaying useful information to a user pertaining to a second party of a telephonic communication.

Referring now to the flowchart of FIG. 7 selected stages of a method are illustrated for presenting second party related information upon a visual display unit such as described above. The information is generally presented when a telephone communication channel is established between the communication system and the second party, for example when a call is received or answered, or alternatively when a call is initiated by a user.

The method includes establishing a telephonic connection between communication system and the second party 702, for example by dialing a telephone number associated with the second party or selecting the second party from a locally stored contacts list or the like.

The second party is identified by the system 704, perhaps by looking up the telephone number in a contact database or by accessing a remote server storing contact data or the like.

Information pertaining to the identified second party may then be obtained 706. For example, information may be obtained locally by accessing a local memory 708. Alternatively or additionally, the system may establish a connection with a computer network 710 and retrieve data stored thereupon 712.

The obtained information pertaining to the second party may be displayed upon a graphical user interface 714 such as described hereinabove. Accordingly, data pertaining to the second party may be presented to the user as required.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

What is claimed is:

1. A method of presenting call party related information, comprising:

receiving or transmitting a request for establishing a voice call between a user of a mobile device having a cellular transceiver and a microphone and at least one party using said cellular transceiver;

communicating, in response to said receiving or transmitting, an indication of said request from said mobile device to a primary unit having a display and a non-cellular transceiver;

acquiring, at and by said primary unit, call party related information related to said at least one party from at least one social network site accessed via a computer network;

initiating said voice call using said cellular transceiver and allowing said user to talk with said at least one party using said microphone;

setting based on said call art related information at least one of a notification, a reminder and an alarm to be displayed when a telephone connection is established with said at least one party, said at least one of said notification, said alarm, and said reminder is regarding an event related to said at least one party;

presenting said at least one of said notification, said alarm, and said reminder in a graphical user interface that is presented over a current presentation of said display during said voice call; and configuring said graphical user interface according to instructions from said user during said voice call over said current presentation;

wherein said indication is forwarded via a direct communication channel between said mobile device and said primary unit;

wherein said primary unit is external to said mobile device and is communicating with said mobile device via a noncellular transceivers.

2. The method of claim 1, wherein said primary unit is a television set having a television screen.

3. The method of claim 2, wherein said presenting comprises presenting said call party related information as an overlay upon a display generated on said television screen.

4. The method of claim 1, wherein said primary unit is connected to a set top box.

5. The method of claim 1, wherein said mobile device is a mobile phone.

6. The method of claim 1, wherein said request is for initiating a telephone call via a cellular network.

7. The method of claim 1, wherein said call party related information is acquired from an application managed by said mobile device.

8. The method of claim 1, wherein said call party related information comprises a plurality of email communications between said user and said at least one party.

9. The method of claim 1, wherein said call party related information comprises meeting data specifying a schedule of meetings between said user and said at least one party.

10. The method of claim 1, wherein said indication is communicated over a wireless local area network.

11. The method of claim 1, wherein said acquiring comprises:

accessing a memory of said mobile device to extract at least some of said call party related information; and forwarding said at least some of said call party related information to said primary unit that receives said call party related information via said non-cellular transceiver.

12. The method of claim 1, wherein said communicating primary unit is installed in a set-top-box (STB) connected to said display, wherein said display is an external display connected to said STB.

13. A system of presenting call party related information, comprising:

a primary unit module which is set to generate an overlay having a graphical user interface upon a display of a primary unit according to data wirelessly received via a non-cellular transceiver;

a mobile device application installed in a mobile device having a cellular transceiver and a microphone, said mobile device application identifies receiving or transmitting a request for establishing a voice call between a user of said mobile device and at least one party using said cellular transceiver and instructs the communicating of an indication of said request from said mobile device to said non-cellular transceiver;

wherein said primary unit module acquires call party related information related to said at least one party from at least one social networking site via a computer network in response to receiving said indication, sets, based on said call party related information, at least one of a notification, a reminder and an alarm to be displayed when a telephone connection is established with said at least one party, and presents said at least one of said notification, said reminder and said alarm in said graphical user interface on said display during a voice call initiated between said user and said at least one party using said cellular transceiver in response to said request and configures said graphical user interface in said overlay according to instructions from said user during said voice call;

wherein said indication is forwarded via a direct communication channel between said mobile device and said primary unit;

wherein said primary unit is external to said mobile device and is communicating with said mobile device via a noncellular transceiver;

wherein said at least one of said notification, said alarm, and said reminder is regarding an event related to said at least one party.

14. The system of claim 13, wherein said primary unit is a television set.

15. The system of claim 13, wherein said primary unit module is installed in a set-top-box (STB) connected to said display.

16. The system of claim 13, wherein said call party related information comprises at least one member of a group selected from: at least one name of said at least one party, at least one image of said at least one party, and at least one avatar of said at least one party.

* * * * *